US011984286B2

(12) United States Patent
Murillo

(10) Patent No.: US 11,984,286 B2
(45) Date of Patent: May 14, 2024

(54) INNER CHAMBERS WITH BLAST ATTENUATION GEOMETRY ON FUSES

(71) Applicant: Littelfuse, Inc., Chicago, IL (US)

(72) Inventor: Clemente Hernandez Murillo, Matehuala (MX)

(73) Assignee: LITTELFUSE, INC., Chicago, IL (US)

( * ) Notice: Subject to any disclaimer, the term of this patent is extended or adjusted under 35 U.S.C. 154(b) by 0 days.

(21) Appl. No.: 17/880,121

(22) Filed: Aug. 3, 2022

(65) Prior Publication Data

US 2024/0047164 A1 Feb. 8, 2024

(51) Int. Cl.
*H01H 85/175* (2006.01)
*H01H 85/17* (2006.01)
*H01H 85/041* (2006.01)

(52) U.S. Cl.
CPC .......... *H01H 85/175* (2013.01); *H01H 85/17* (2013.01); *H01H 85/1755* (2013.01); *H01H 2085/0414* (2013.01)

(58) Field of Classification Search
CPC .......... H01H 85/165–1755; H01H 2085/0412; H01H 2085/0414
See application file for complete search history.

(56) References Cited

U.S. PATENT DOCUMENTS 4,612,529 A * 9/1986 Gurevich ........... H01H 85/0417 337/260
5,914,649 A * 6/1999 Isono ................. H01H 85/0411 337/296
6,452,474 B1 * 9/2002 Oh ..................... H01H 85/0417 337/186
2005/0141164 A1 * 6/2005 Bender ................ H01H 85/046 361/104
2006/0055497 A1 * 3/2006 Harris .................. H01H 85/045 337/14
2014/0266564 A1 * 9/2014 Enriquez .............. H01H 85/175 337/295
2015/0294828 A1 10/2015 Burge
(Continued)

OTHER PUBLICATIONS

Arun Kumar R, Vaibhav Pathak, Shock wave mitigation using zig-zag structures and cylindrical obstructions, Defence Technology, vol. 17, Issue 6, 2021, pp. 1840-1851.
(Continued)

*Primary Examiner* — Jacob R Crum
(74) *Attorney, Agent, or Firm* — KDW Firm PLLC

(57) ABSTRACT

A fuse includes multiple stacked layers, a first terminal, and a second terminal. The first terminal is connected to one end of a fusible element and the second terminal is connected to the other end. The stacked layers include first and second intermediate layers and a special layer. The first intermediate layer, which has a centrally disposed opening, is stacked on the first terminal and the second terminal. The second intermediate layer, also having a centrally disposed opening is stacked above the first intermediate layer, and the centrally disposed openings define a chamber above the fusible element. The special layer is located between the first intermediate layer and the second intermediate layer and includes one or more geometric elements. The geometric elements divide the chamber into two sub-chambers, the first sub-chamber being above the second sub-chamber.

20 Claims, 12 Drawing Sheets

(56) References Cited

U.S. PATENT DOCUMENTS

| | | | | |
|---|---|---|---|---|
| 2015/0340188 | A1* | 11/2015 | Schmidt | H01H 85/05 337/186 |
| 2016/0372294 | A1* | 12/2016 | Nan | H01H 85/175 |
| 2020/0161068 | A1* | 5/2020 | Enriquez | H01H 69/02 |

OTHER PUBLICATIONS

Hadjadj, A., Sadot, O. Shock and blast waves mitigation. Shock Waves 23, 1-4 (2013).
1 European Search Report for EP Application No. 23189367.8, dated Dec. 11, 2023, 13 pages.

* cited by examiner

INNER CHAMBERS WITH BLAST ATTENUATION GEOMETRY ON FUSES

FIELD OF THE DISCLOSURE

Embodiments of the present disclosure relate to fuses having stacked layers or hollow bodies, more particularly, to improving the end-of-life operation of the fuse.

BACKGROUND

Melamine fuses consist of melamine layers riveted together to form a fuse body. Considered very fast acting fuses, the melamine fuses feature a window that shows the fuse status. Melamine fuses are also known as lift truck fuses, as they are found in lift trucks, scissor lifts, pallet movers, and other low voltage battery operated equipment used to move hazardous material.

In contrast to some fuses, the layers of melamine fuses do not include filler material, such as sand, to prevent fire and sparks coming out of the fuse. When an overcurrent event happens, the shock blast travels up the fuse chamber, then between the melamine layers. Melamine fuses could benefit from having a mechanism to better control its blast path.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a fuse in accordance with the present disclosure may include a fusible element, a first terminal, a second terminal, and multiple stacked layers. The first terminal is connected to one end of the fusible element and the second terminal is connected to the other end. The stacked layers include first and second intermediate layers and a special layer. The first intermediate layer, which has a centrally disposed opening, is stacked on the first terminal and the second terminal. The second intermediate layer, also having a centrally disposed opening, is stacked above the first intermediate layer, with the centrally disposed openings defining a chamber above the fusible element. The special layer is located between the first intermediate layer and the second intermediate layer and includes one or more geometric elements. The geometric elements divide the chamber into two sub-chambers, the first sub-chamber being above the second sub-chamber.

Another exemplary embodiment of a fuse in accordance with the present disclosure may include a fusible element, a first intermediate layer, a second intermediate layer, and a special layer. The fusible element is located between two terminals. The first intermediate layer is a rectangular plate with a centrally disposed cutout. The second intermediate layer is also a rectangular plate with a centrally disposed cutout. The fusible element is sandwiched between the first intermediate layer and the second intermediate layer. The first intermediate layer forms a chamber above the fusible element and the second intermediate layer forms a second chamber below the fusible element. The special layer is a rectangular plate with a geometric element. The special layer is stacked upon the first intermediate layer and divides the first chamber into a first sub-chamber and a second sub-chamber. The geometric element provides a pathway between the first sub-chamber and the second sub-chamber.

DETAILED DESCRIPTION

A fuse is disclosed with one or more special layers to facilitate the effective movement of debris once the fusible element breaks, the end-of-life event of the fuse. The fuse is a type having stacked horizontal layers, such as in melamine and hollow body fuses. One or more of the horizontal layers is replaced with special layers having geometric elements. The special layers cause the chamber holding the fusible element to be split into sub-chambers, with the geometric elements providing pathways for the movement of debris following the fusible element explosion. Variations in the number and type of special layers is possible, such as to support fuses of different ratings.

For the sake of convenience and clarity, terms such as "top", "bottom", "upper", "lower", "vertical", "horizontal", "lateral", "transverse", "radial", "inner", "outer", "left", and "right" may be used herein to describe the relative placement and orientation of the features and components, each with respect to the geometry and orientation of other features and components appearing in the perspective, exploded perspective, and cross-sectional views provided herein. Said terminology is not intended to be limiting and includes the words specifically mentioned, derivatives therein, and words of similar import.

Figure 1A:
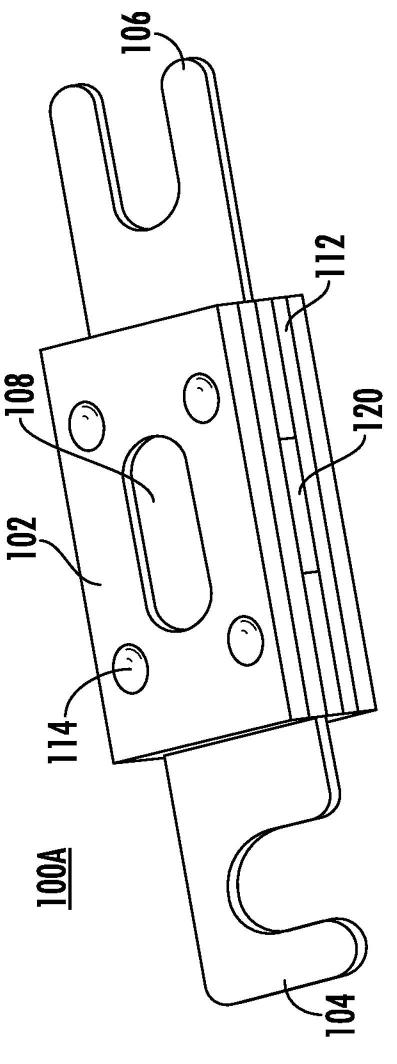
FIG. 1A (PRIOR ART)
FIGS. 1A-1D are diagrams illustrating a melamine fuse, in accordance with the prior art.
Figure 1B:
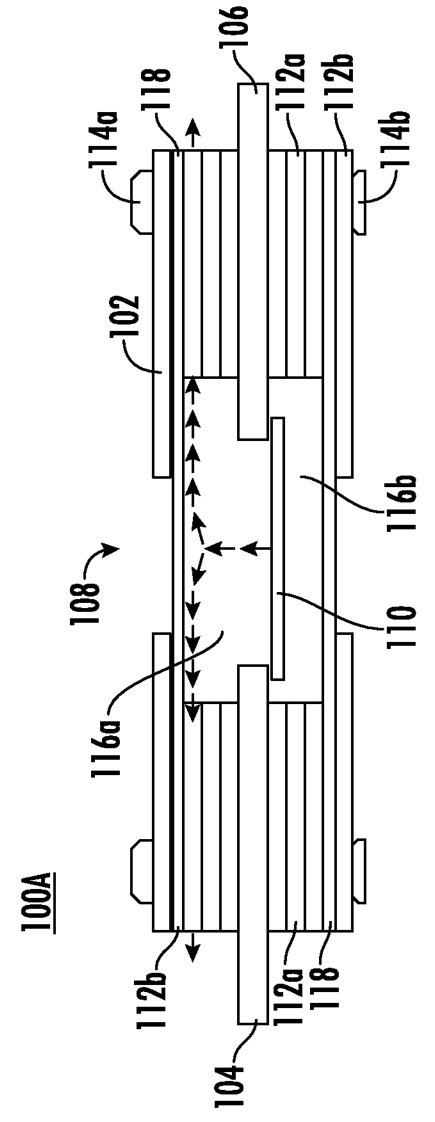
FIG. 1B (PRIOR ART)
Figure 1C:
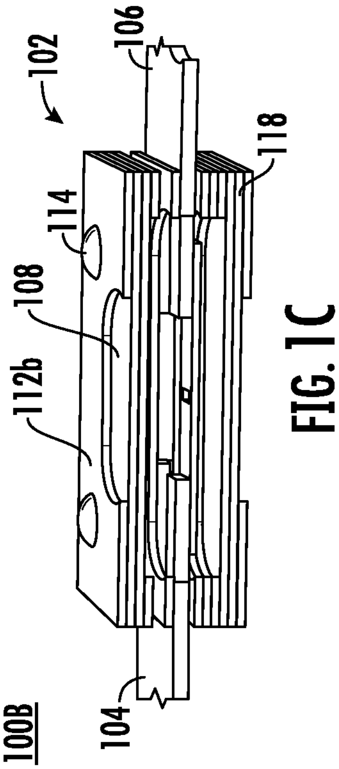
FIG. 1C (PRIOR ART)
Figure 1D:
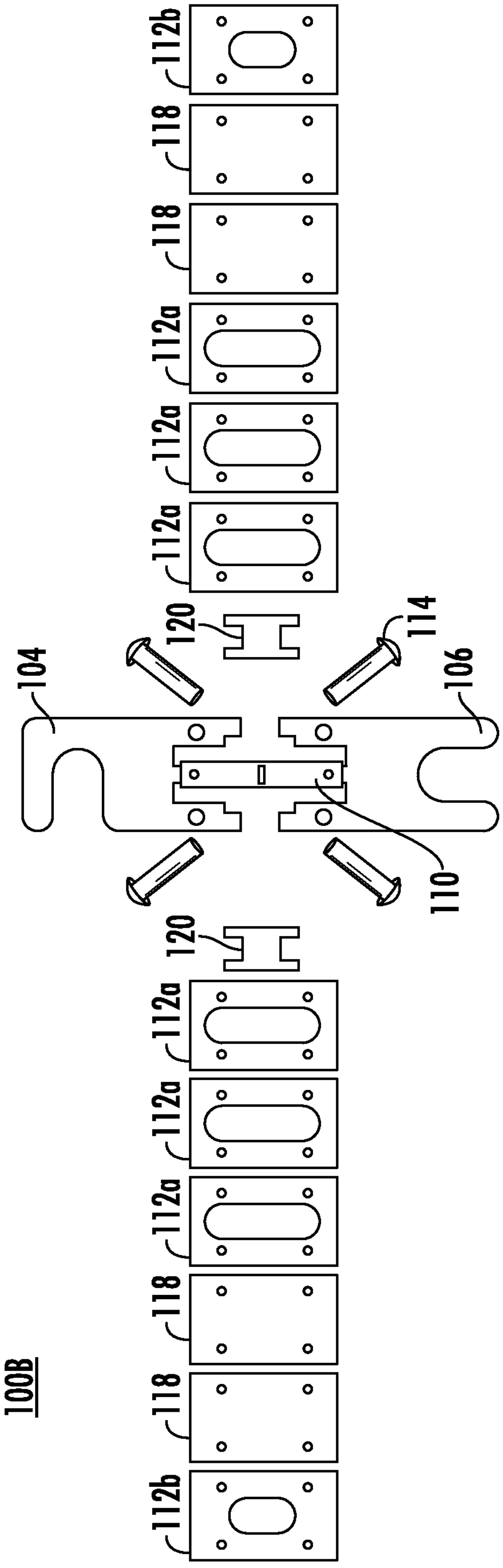
FIG. 1D (PRIOR ART)

FIGS. 1A-1D are representative drawings of two melamine fuses 100A and 100B (collectively, "melamine fuses 100"), according to the prior art. FIG. 1A is a perspective view and FIG. 1B is a side view of the melamine fuse 100A; FIG. 1C is a perspective cutaway view and FIG. 1D is an exploded view of the melamine fuse 100B. The two melamine fuses 100A and 100B are different only in the number and type of layers and are otherwise similar. Each melamine fuse 100 consists of a fuse body 102, a first terminal 104, and a second terminal 106, with a fusible element 110 disposed between the two terminals. The body 102 is a multi-layered "sandwich" configuration consisting of the terminals 104 and 106, melamine layers, and mica layers. The fuse body 102 features layers 112*a* having larger openings or holes and layers 112*b* having smaller openings or holes, relative to one another (collectively, "layers 112" or "melamine layers 112"). Although the difference between the layers 112*a* and layers 112*b* is apparent in FIG. 1B, the size of respective openings/holes is more clear in the exploded view of FIG. 1D. The layers 112 are made of melamine, an organic compound. Although the openings/holes in the layers 112*b* are small, rounded rectangles in the case of layers 112*b* and larger rounded rectangles in the case of layers 112*a*, the openings/holes may be shaped differently.

Layers of mica 118 are also part of the fuse body 102. The melamine fuse 100A has two mica layers 118, one being close to the top and the other being close to the bottom (FIG. 1B). The melamine fuse 100B has two mica layers 118 on either side of the fuse body 102. A layer 112*b* is at the top of the fuse body 102. The mica layers 118 are transparent and, along with the layer 112*b*, create a status window 108 to show the condition of the fusible element 110 (e.g., whether the fusible element has broken).

The layers 112, the mica layers 118, and the terminals 104, 106 are held together using rivets, with a top portion 114*a* and a bottom portion 114*b* showing in FIG. 1B (collectively, "rivets 114"). To accommodate the rivets 114, the layers 112, the mica layers 118, as well as the first terminal 104 and the second terminal 106 have apertures through which the rivets 114 are inserted. Once the rivets 114 are secured, the terminals 104 and 106 are tightly held in place by the melamine layers 112 and the mica layers 118.

The fusible element 110 is connected between the first terminal 104 and the second terminal 106. The fusible element 110 is shown connected beneath the first terminal 104 and the second terminal 106, although the fusible element 110 may alternatively be connected above the two terminals. The arrangement of fusible element 110 with the first terminal 104 and the second terminal 106, as well as the layers 112*a*, result in the formation of two chambers 116*a* and 116*b* (collectively, "chambers 116"), where the chamber 116*a* is above the fusible element 110 and the chamber 116*b* is below the fusible element 110. Shown in FIGS. 1A and 1D, spacers 120 are inserted between the terminals 104 and 106 and are in the same plane as the terminals.

In response to an overcurrent or overvoltage event, the fusible element 110 is designed to break, disrupting the flow of current between the first terminal 104 and the second terminal 106. The break, which is an end-of-life event for the fuse, causes an explosive blast, causing the material of the fusible element 110 to dissipate as debris. Arrows in FIG. 1B show a likely path of the explosion, upward from the fusible element 110 into the first chamber 116*a* and then between one or more of the melamine layers 112.

Designing a fuse includes making sure current does not flow between the terminals after the fusible element breaks. Arc energy and outgassing that coincides with the breaking of the fuse may cause a debris path to be formed by electrically conductive residue from the fuse element and/or carbonized material from the fuse housing. When this occurs, there may be an electrically conductive path formed along the debris path that is sufficient for current to travel across the terminals. Thus, although the fusible element has broken, the fuse has not fulfilled its intended purpose, which is to prevent damage to other components in the circuitry. Some fuses include material filler such as sand to mitigate the explosion flow, fire, and sparks, although melamine fuses do not typically include filler.

A shock attenuation strategy may be considered to reduce the incident shock strength. Geometric blockages may be placed in the flow passage ahead of the target. The geometric blockages produce shock reflection and attenuate the shock strength. Various geometric blockages, such as grids, orifice plates, perforated plates, arrayed baffle plates, matrices of solid obstacles of various shapes, may provide good shock attenuation based on the flow passage created by these blockages. Such a strategy may be useful when considering fuse housing design.

Figure 2A:
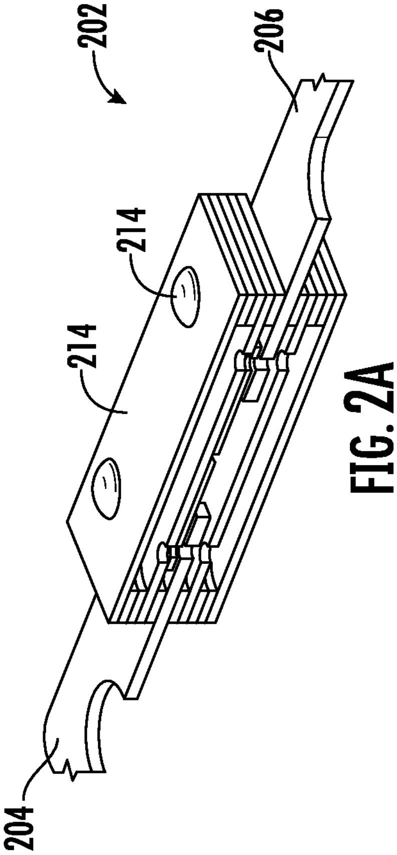
FIGS. 2A-2D are diagrams illustrating a melamine fuse, in accordance with exemplary embodiments.
Figure 2B:
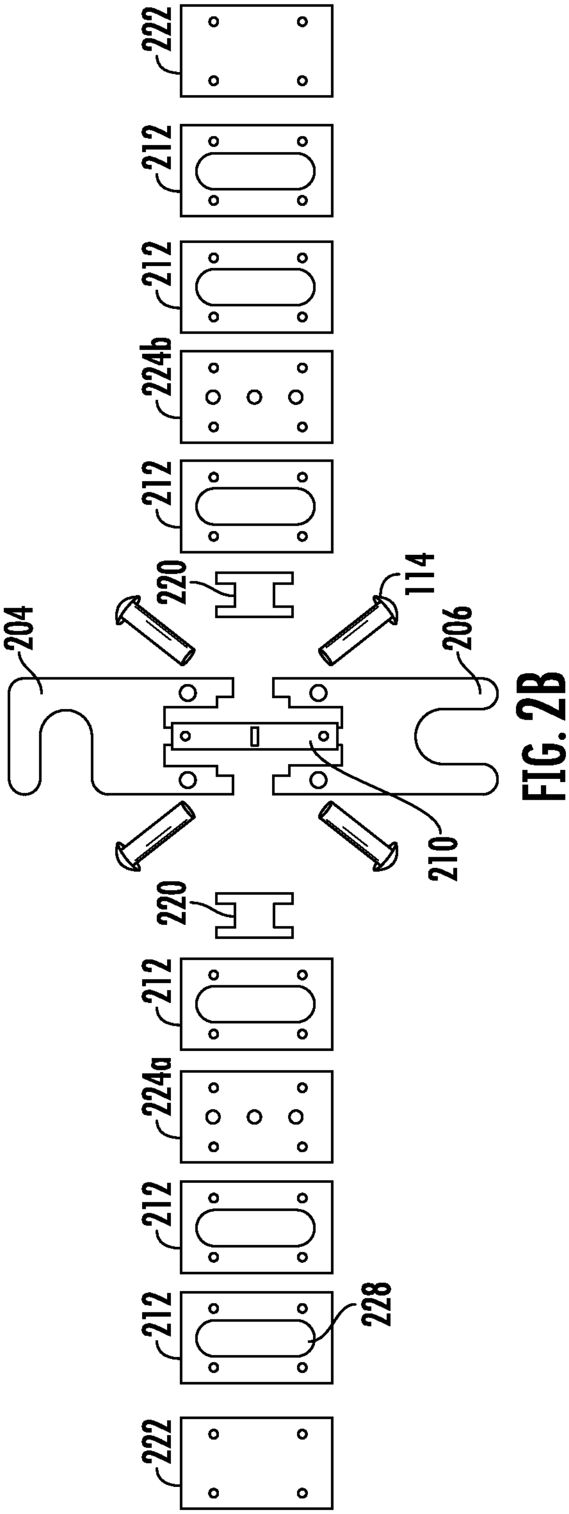
Figure 2C:
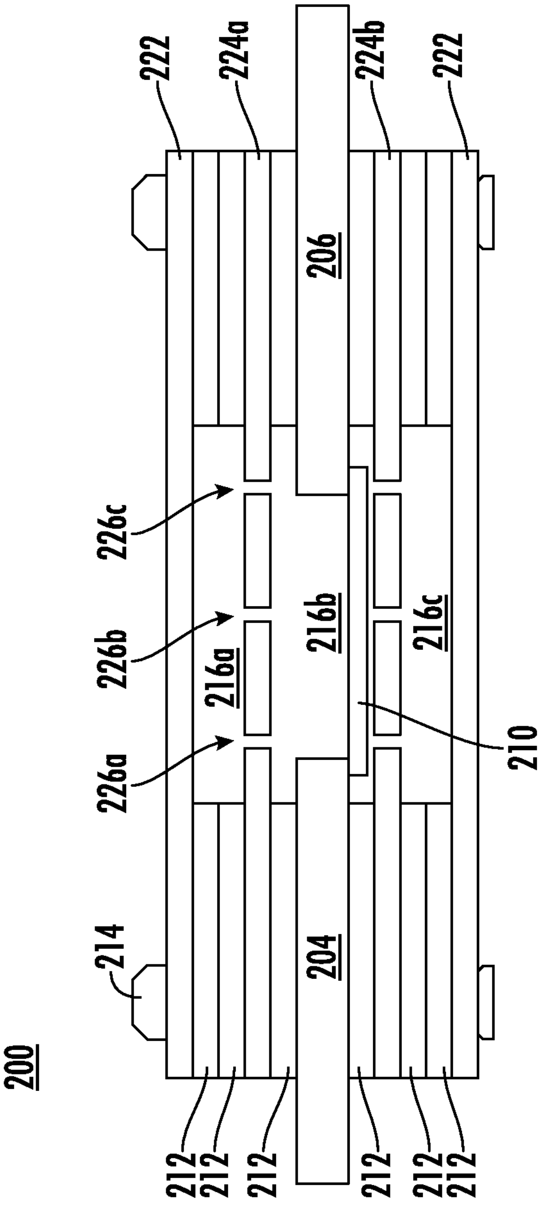
Figure 2D:
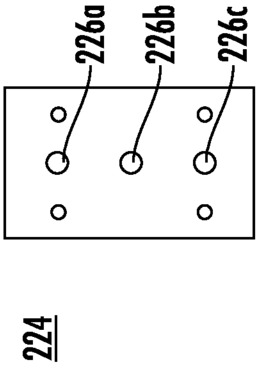

FIGS. 2A-2D are representative drawings of a melamine fuse 200, according to exemplary embodiments. FIG. 2A is a cutaway perspective view; FIG. 2B is an exploded view; FIG. 2C is a side view of the melamine fuse 200; FIG. 2D is a close-up view of a special layer used in the melamine fuse 200. The melamine fuse 200 consists of a fuse body 202, a first terminal 204, and a second terminal 206, with a fusible element 210 disposed between the two terminals. Alternatively, the melamine fuse 200 may have three or more terminals. The body 202 is a multi-layered "sandwich" configuration consisting of the terminals 204 and 206 and melamine layers. In contrast to the melamine fuses 100, the melamine fuse 200 does not feature a status window, and thus does not include mica layers. Instead, the fuse body 102 features intermediate layers 212 having centrally disposed openings or holes, cover layers 222, a special layer 224*a* (above the fusible element 210) and a second special layer 224*b* (below the fusible element 210) (collectively, "special layers 224"). The intermediate layers 212, the cover layers 222, and the special layers 224 are made of melamine. The principles described herein may be applied to other types of hollow body fuses besides melamine fuses.

Looking at the exploded view of FIG. 2B, the cover layers 222, the intermediate layers 212, and the special layers 224 are rectangular plates, with each plate being approximately the same dimension. The centrally disposed openings or holes of the intermediate layers 212 are elongated circular cutouts 228 in the center of each rectangular plate. When the plates are stacked upon one another, the circular cutouts 228 form chambers 216. In non-limiting examples, the elongated circular cutouts 228 may alternatively be elongated rectangles, rounded rectangles, circles, ovals, or some other shape. The rectangular plates forming the special layers 224 are stamped with one or more geometric elements designed to form blocking structures within the chambers 216.

The intermediate layers 212, the cover layers 222, the special layers 224, and the terminals 204, 206 are held together using rivets 214. Thus, the intermediate layers 212, the cover layers 222, the special layers 224, and the terminals 204, 206 have apertures through which the rivets 214 are inserted. Once the rivets 214 are secured, the terminals 204 and 206 are tightly held in place by the various melamine layers. The fusible element 210 is connected between the first terminal 204 and the second terminal 206. Spacers 220 are inserted between the terminals 204 and 206 and are in the same plane as the terminals.

Recall from the prior art melamine fuse 100 that the connection of the fusible element 110 between the terminals 104 and 106 creates two chambers 116*a* and 116*b*. The breakage of the fusible element 110 causes material from the explosive blast to dissipate through the upper chamber 116*a*, as the arrows indicate in FIG. 1B. In exemplary embodiments, the special layers 224 have the effect of dividing the interior space of the melamine fuse 200 into additional chambers, three of which are noted in FIG. 2C: chambers 216*a*, 216*b*, and 216*b* (collectively, "chambers 216"). So, where the melamine fuse 200 would otherwise have a single chamber, the presence of the special layer 224*a* divides the chamber into two chambers 216*a* and 216*b*. Further, while the chambers 116*a* and 116*b* of the prior art melamine fuse 100 can be said to be closed chambers, the chambers 216*a* and 216*b* are open to one another, because the special layer 224 has holes 226*a*, 226*b*, and 226*c* (collectively, "holes 226") that form pathways between chambers 216. For example, the three holes 226*a-c* of special layer 224*a* create three pathways between chamber 216*b* and 216*a*. The holes 226 are thus geometric blockages that produce shock reflection and attenuate the shock strength of the explosive blast of the fusible element. In exemplary embodiments, when an overcurrent event happens, the explosion goes through chamber 216*b*, then through chamber 216*a*, all the way to the top of the melamine fuse 200, then between the melamine layers.

Due to the presence of the special layer 224, in exemplary embodiments, the explosion of the fusible element 210 occurs in the chamber 216*b*, then, the blast flow circulates and most of the blast is absorbed by the walls of the center chamber 216*b*. Excessive shock wave should go through the holes 226 of the special layer 224 instead of going out through the melamine layers, which is what happens with the prior art melamine fuse 100. Any remaining shock wave is directed through the holes 226 to the chamber 216*a* and the chamber 216*c* at the same time.

Figure 3A:
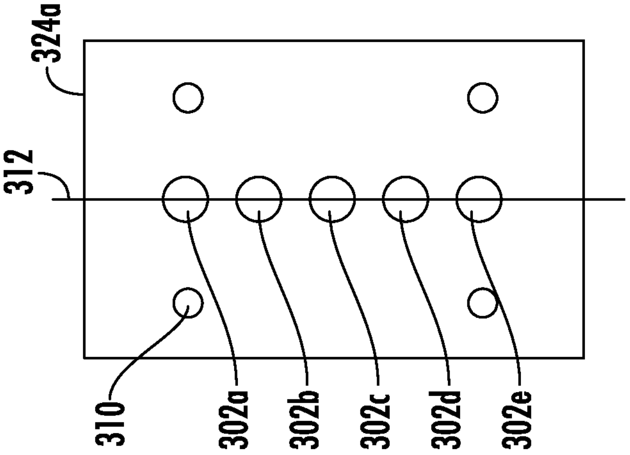
FIGS. 3A-3C are diagrams illustrating special layers to be used in a melamine fuse, in accordance with exemplary embodiments.
Figure 3B:
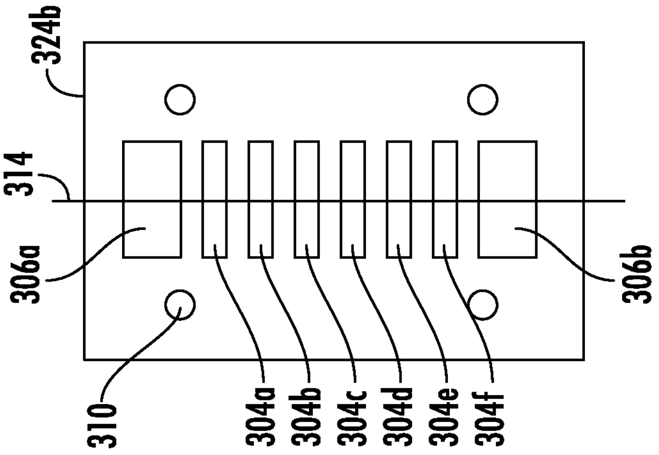
Figure 3C:
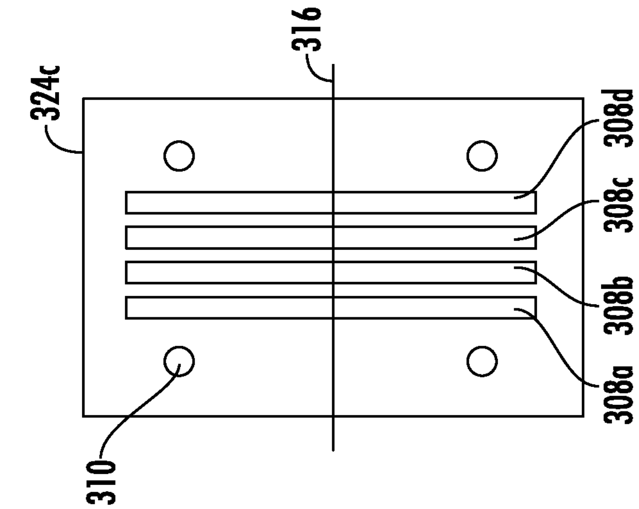

The presence of multiple sandwiched layers of the melamine fuse 200 presents opportunities to add further geometric blockages via special layers. FIGS. 3A-3C are representative drawings of special layers that may replace one or more layers of a melamine fuse, such as the melamine fuse 200, according to exemplary embodiments. Special layer 324*a* is shown in FIG. 3A, special layer 324*b* is shown in FIG. 3B, and special layer 324*c* is shown in FIG. 3C (collectively, "special layers 324"). Just as with other layers of a melamine fuse, the special layers 324 have four rivet holes 310 to allow the rivets to be inserted through each layer.

Special layer 324*a* features five holes 302*a-e* (collectively, "holes 302") aligned in the along a vertically disposed center line 312 of the special layer 324*a*, where the holes 302 are in the same plane and equidistant between the rivet holes 310. As an alternative, the holes 302 may be positioned so that they are not all in the same plane but are distributed with hole 302*a* being left of the center line 312, hole 302*b* being right of the center line, hole 302*c* being left of the center line, hole 302*d* being right of the center line, and hole 302*e* being left of the center line. As another option, the holes 302 may be randomly placed along the special layer 324*a*.

Special layer 324*b* features six small rectangles 304*a-f* (collectively, "small rectangles 304") and two large rectangles 306*a-b* (collectively, "large rectangles 306") aligned along a vertically disposed center line 314, with the large rectangles 306 being at the end of the special layer 324*b* and the small rectangles 304 being between the large rectangles 306, with all rectangles being aligned in a plane between the rivet holes 310. Alternatively, small rectangles 304*a*, 304*c*, and 304*e* may be disposed to the left of the center line 314 while small rectangles 304*b*, 304*d*, and 304*f* are disposed to the right of the center line. Or the large rectangles 306 and the small rectangles 304 may be arranged randomly without referencing the center line 314. Many other arrangements are possible.

Special layer 324*c* features four lines 308*a-d* (collectively, "lines 308"), which could also be described as long rectangles. The lines 308 are aligned along horizontally disposed center line 316, are adjacent one another, and are disposed between the rivet holes 310. Like the other geometric elements, the lines 308 may be arranged differently. For example, lines 308*a* and 308*c* may be one length while lines 308*b* and 308*d* are a different length. Many other arrangements are possible.

Many variations of the special layers 324 are possible. By stacking one or more special layers 324 among the other layers of a melamine fuse, the holes 302, small rectangles 304, large rectangles 306, and lines 308 create structures (e.g., perforations) within the fusible element chamber that create geometric blockages. These geometric blockages produce shock reflection and attenuate the shock strength of the explosive blast of the fusible element. As a result, a debris path that enables a current to pass between the two terminals is less likely to occur. The special layers 224 (FIG. 2B) and 324 (FIGS. 3A-3E) provide an alternative to using material filler to mitigate the explosion flow. In exemplary embodiments, the special layers 224, 324 are made using the same material that is used for the other layers.

Figure 4A:
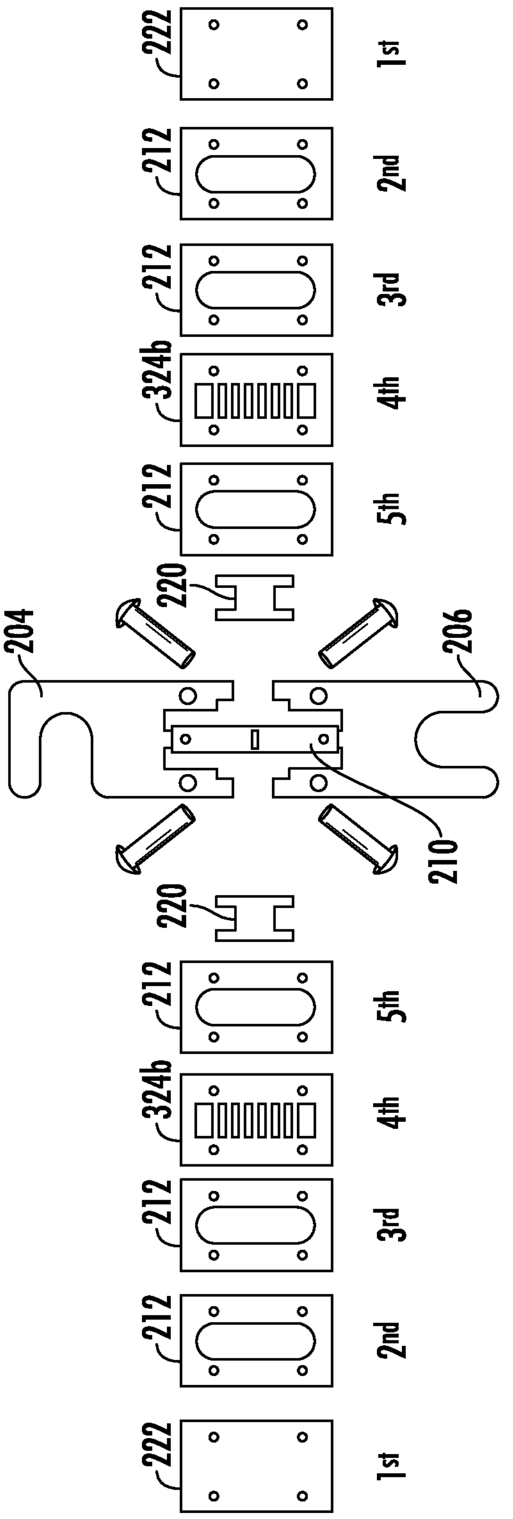
FIGS. 4A-4L are diagrams illustrating melamine fuses including special layers, in accordance with exemplary embodiments.
Figure 4B:
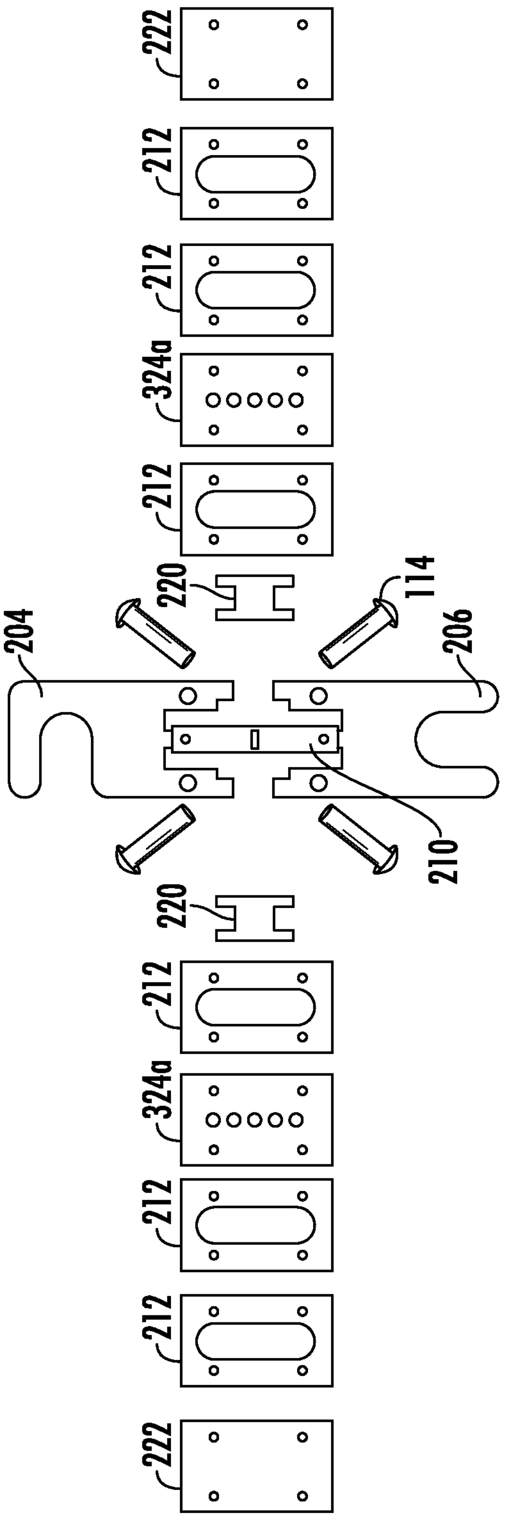
Figure 4C:
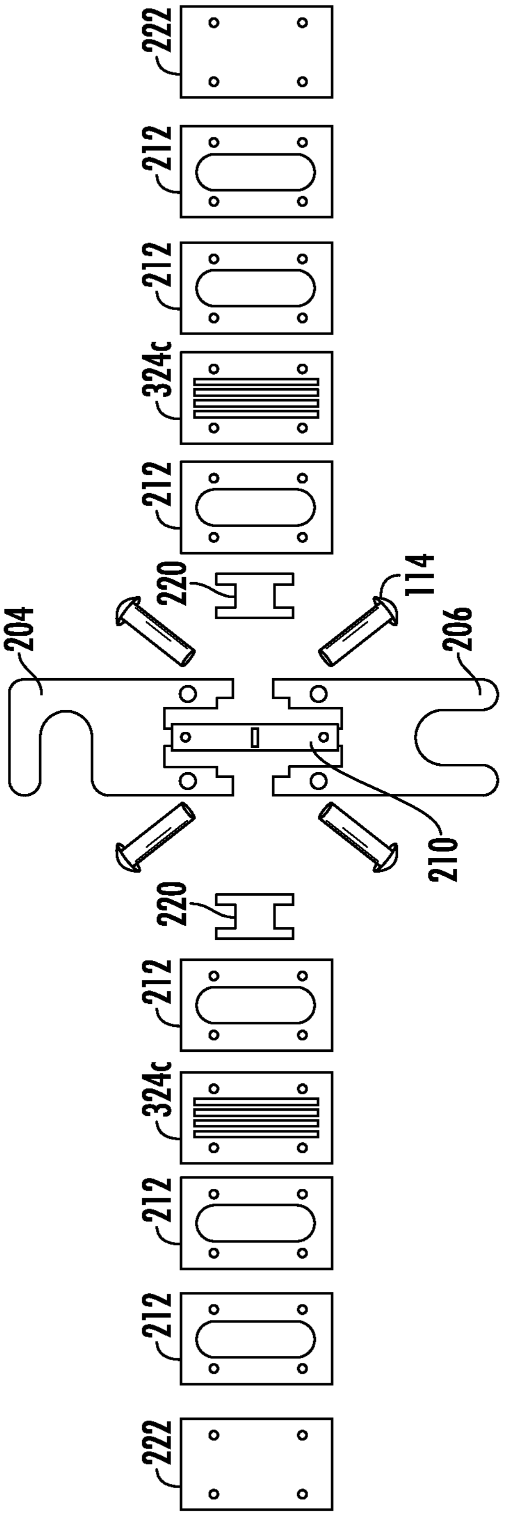
Figure 4D:
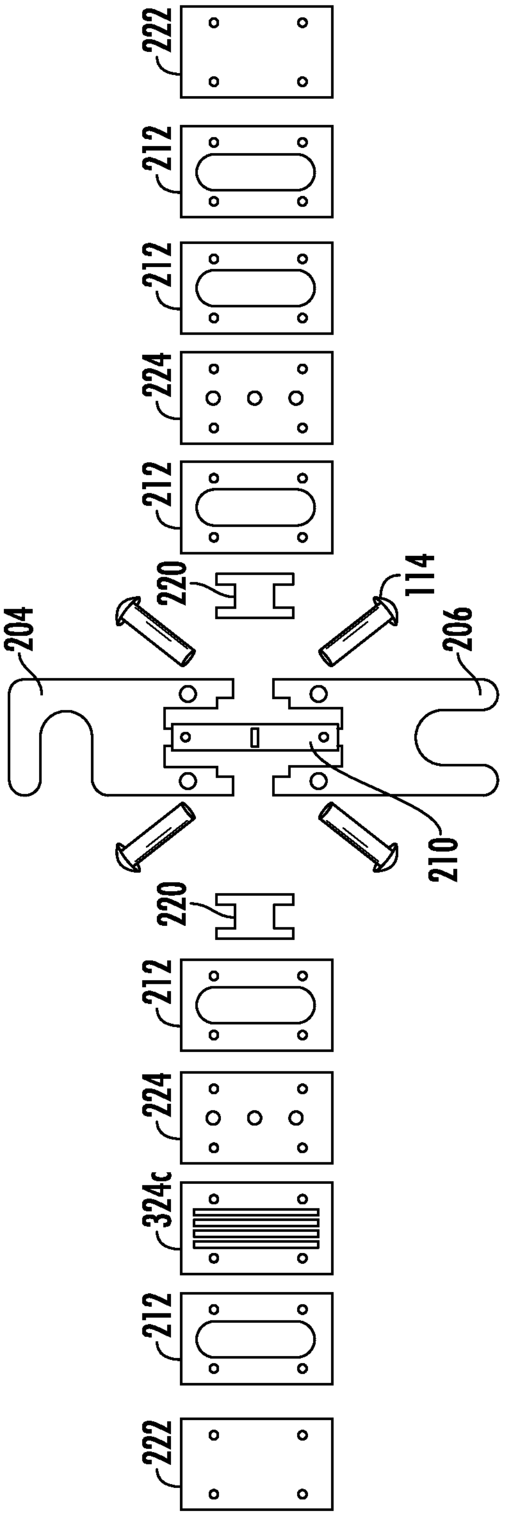
Figure 4E:
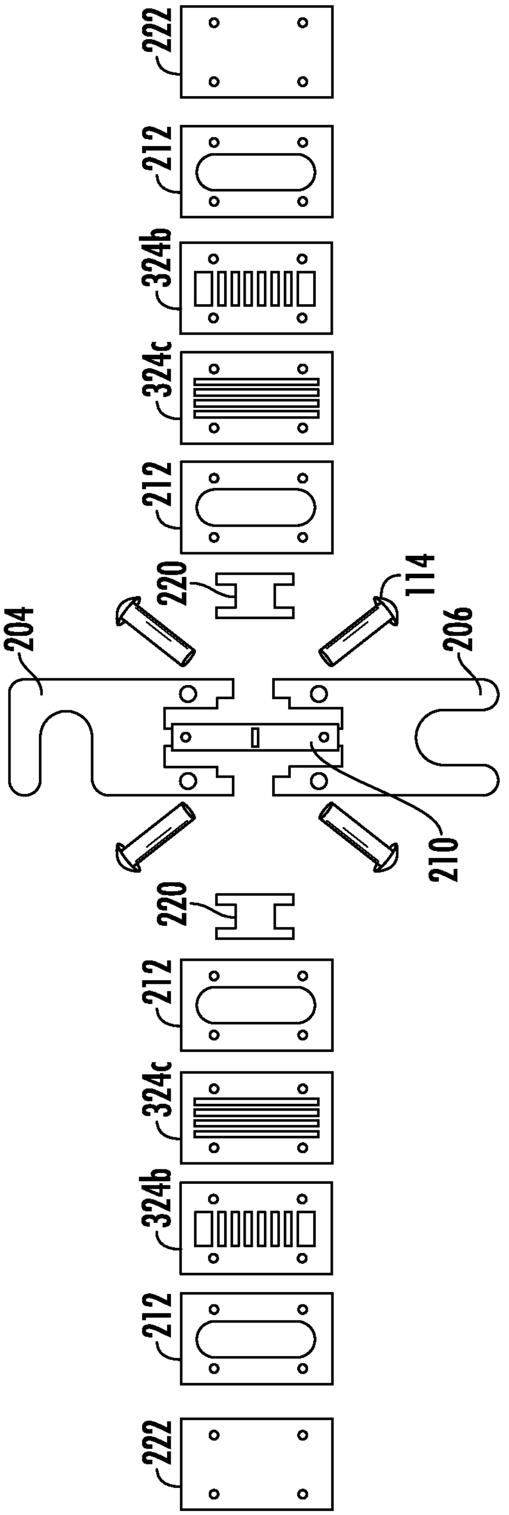
Figure 4F:
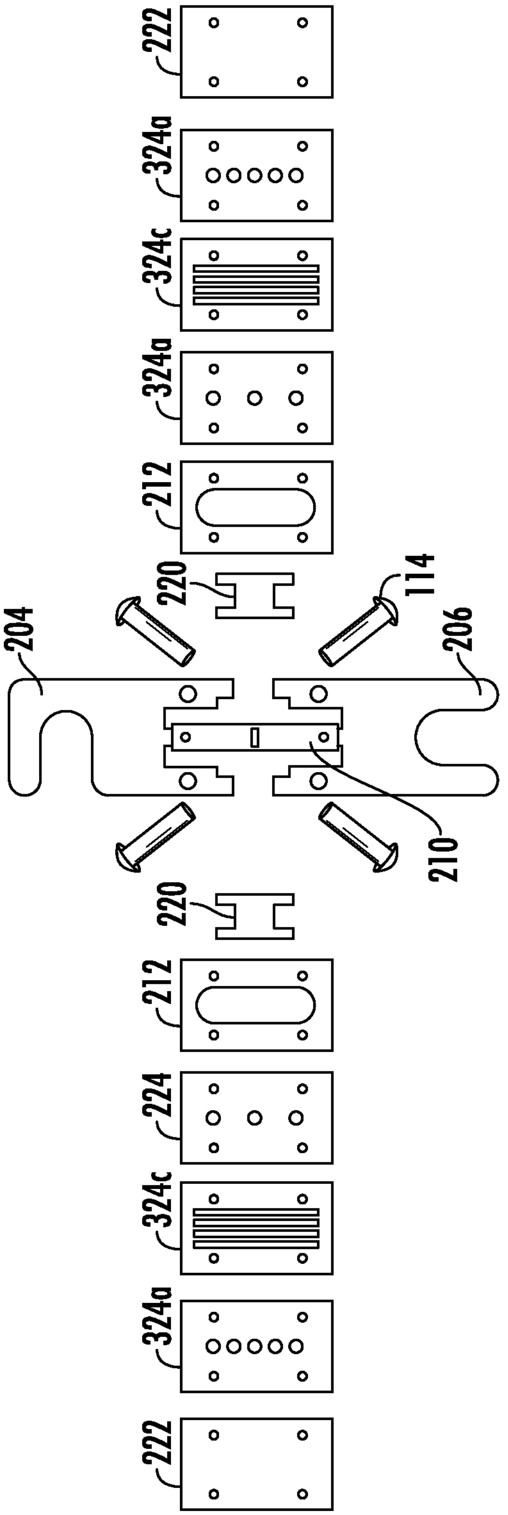
Figure 4G:
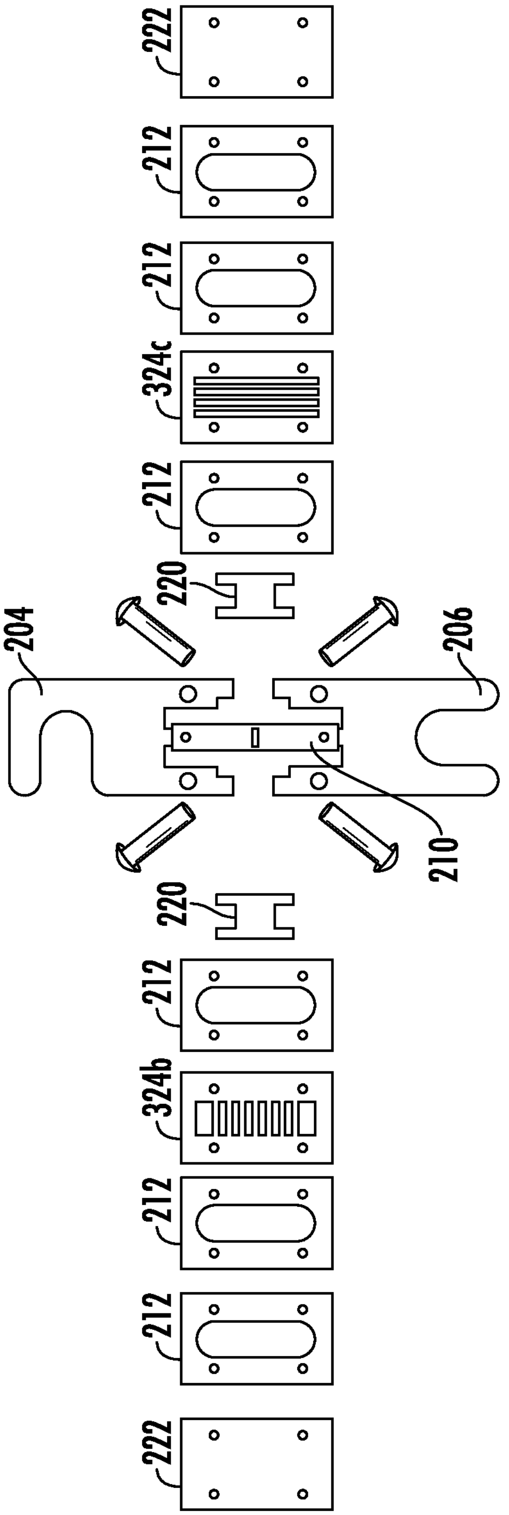
Figure 4H:
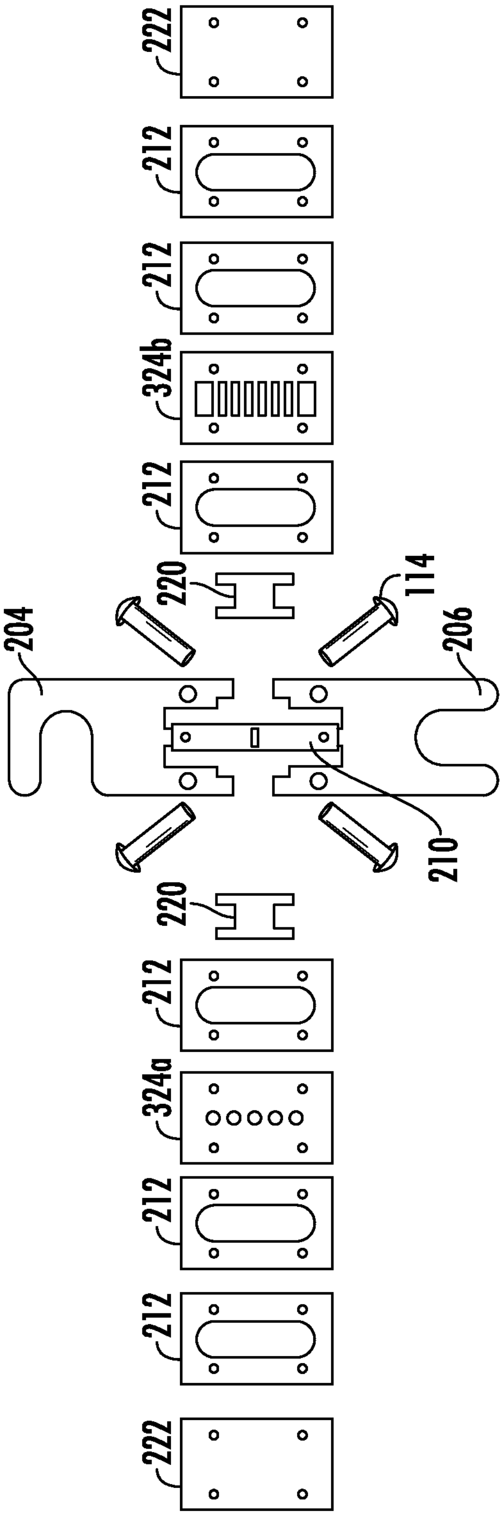

FIGS. 4A-4L are representative drawings of melamine fuses having one or more special layers, according to exemplary embodiments. The drawings are exploded views of melamine fuses, like the melamine fuse 200 of FIG. 2B. In FIGS. 4A-4F, both sides of the melamine fuses include special layers. In FIGS. 4G-4H, both sides of the melamine fuses include special layers but they are different from one another. In FIGS. 4I-4L, one side of the melamine fuses include special layers. Designers of ordinary skill in the art will recognize many variations of the arrangements presented in these drawings, as they are not meant to be limiting.

In describing the location of special layers, FIG. 4A shows a legend, with the position of each layer being relative to the end. Thus, for example, the cover layers 222 are in the first position relative to the end. In FIG. 4A, special layer 324*b* is in the fourth position on each side of the fusible element 210. In FIG. 4B, special layer 324*a* is in the fourth position on each side of the fusible element 210. In FIG. 4C, special layer 324*c* is in the fourth position on each side of the fusible element 210. In FIG. 4D, special layer 224 (FIG. 2B) is in the fourth position and special layer 324*c* is in the third position, both being on each side of the fusible element 210. In FIG. 4E, special layer 324*c* is in the fourth position and special layer 324*b* is in the third position, both being on each side of the fusible element 210. In FIG. 4F, special layer 224 is in the fourth position, special layer 324*c* is in the third position, and special layer 324*a* is in the second position, all three being on each side of the fusible element 210.

Figure 4I:
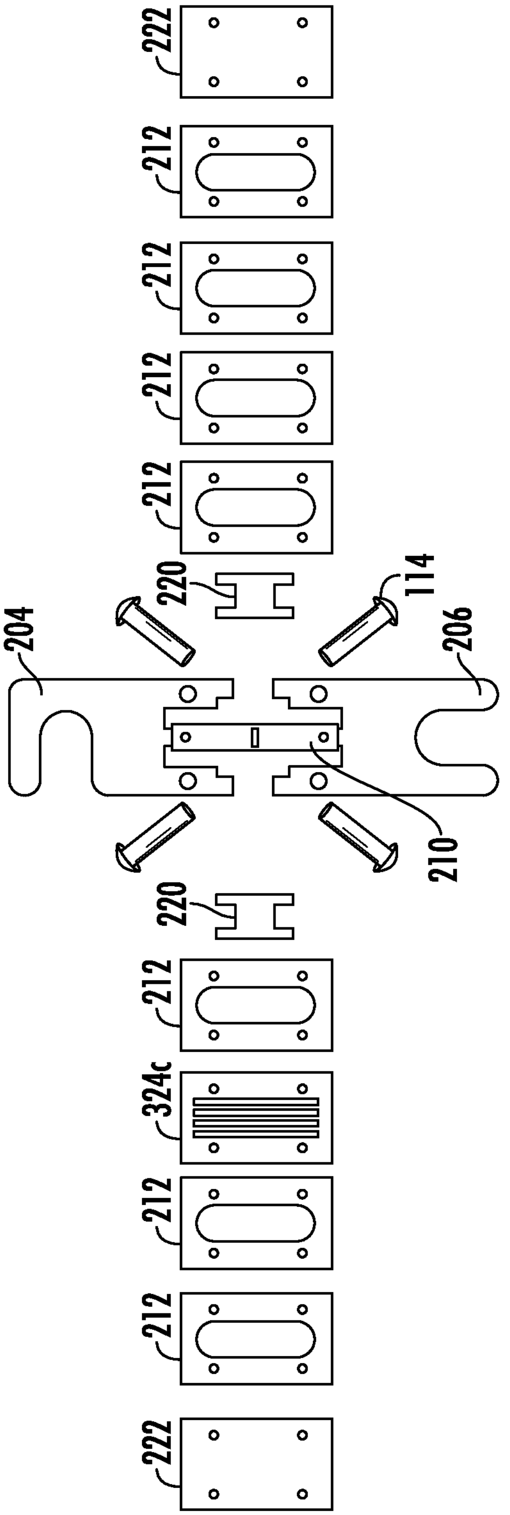
Figure 4J:
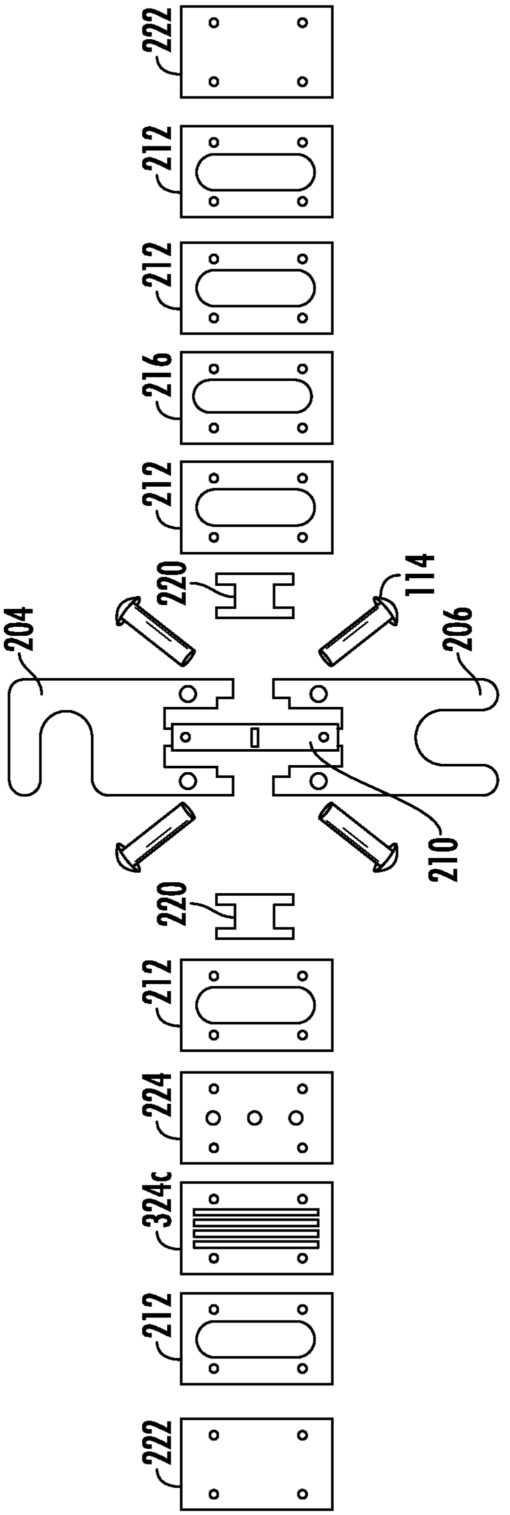
Figure 4K:
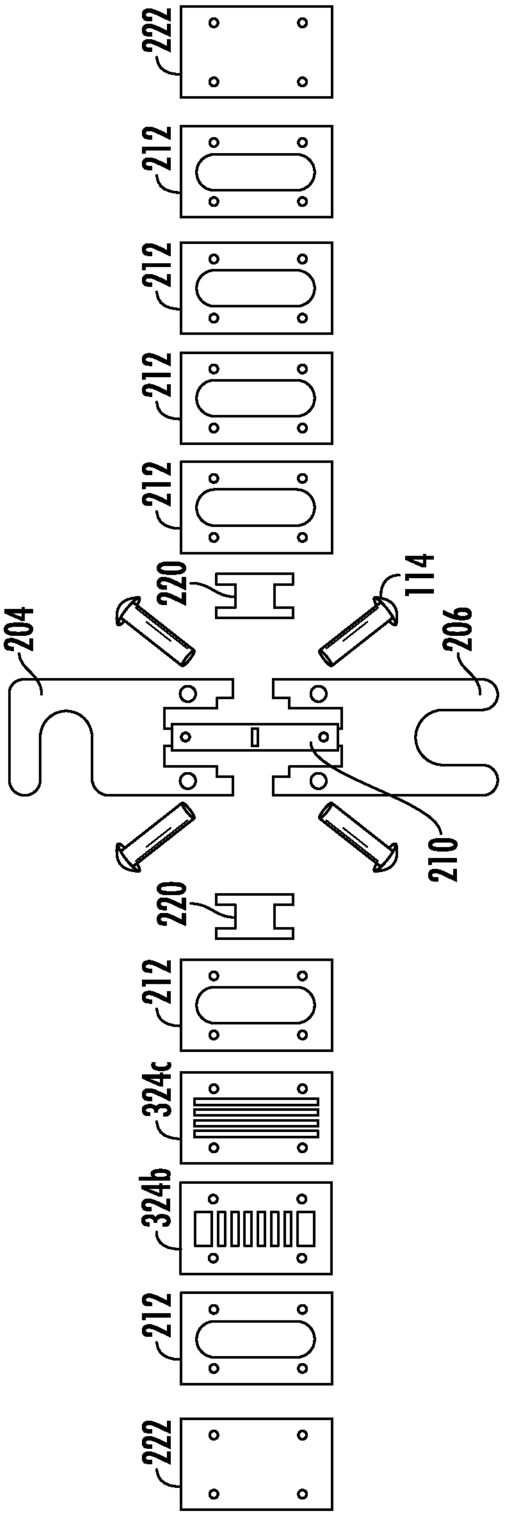
Figure 4L:
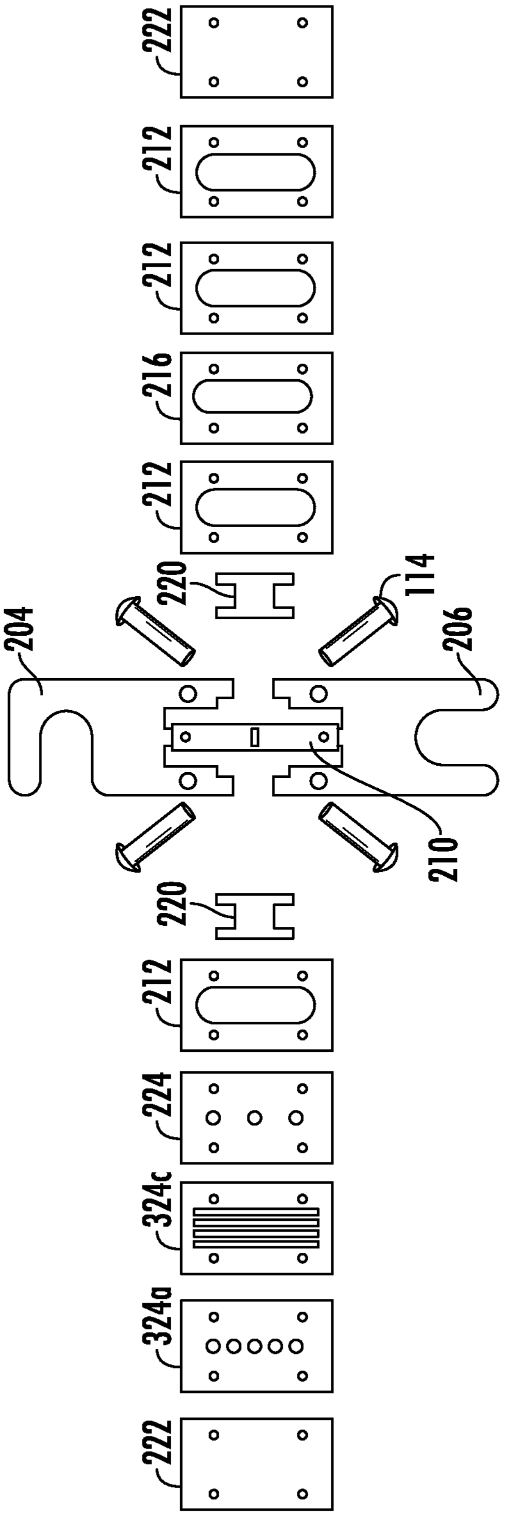

In FIG. 4G, special layer 324*b* is in the fourth position on one side of the fusible element 210 while special layer 324*c* is in the fourth position on the other side of the fusible element. In FIG. 4H, special layer 324*a* is in the fourth position on one side of the fusible element 210 while special layer 324*b* is in the fourth position on the other side of the fusible element. In FIG. 4I, special layer 324*c* is in the fourth position on one side of the fusible element 210. In FIG. 4J, special layer 224 is in the fourth position and special layer 324*c* is in the third position, on one side of the fusible element 210. In FIG. 4K, special layer 324*c* is in the fourth position and special layer 324*b* is in the third position, on one side of the fusible element 210. In FIG. 4L, special layer 224 is in the fourth position, special layer 324*c* is in the third position, and special layer 324*a* is in the second position, on one side of the fusible element 210.

Figure 5:
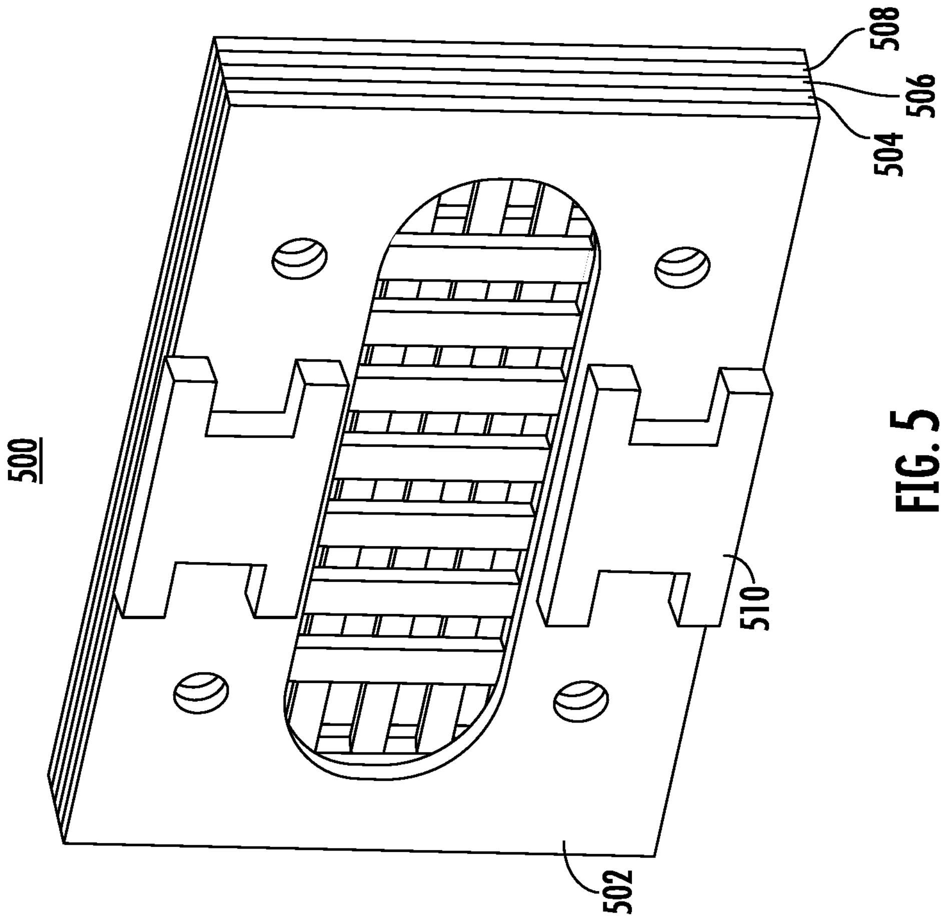
FIG. 5 is a diagram illustrating a melamine fuse having multiple special layers, in accordance with exemplary embodiments.

FIG. 5 is a representative drawing of a melamine fuse 500, according to exemplary embodiments. The melamine fuse 500 includes a layer 502 having an opening or hole (so that the special layers are visible), a special layer 504, a second, different special layer 506, and a third, different special layer 508. Spacers 510 are used where the terminals (not shown) will be.

The principles described herein may be extended to a variety of different types of fuses, not simply those using melamine. Any fuse in which there are multiple layers sandwiched together, in which some layers are shaped to form a chamber for the fusible element, may be candidates for replacing one or more layers with a special layer that create geometric blockages within the chamber. Further, the number and arrangement of special layers may be adjusted to support fuses of different ratings.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A fuse comprising:
- a fusible element;
- a first terminal coupled to a first end of the fusible element;
- a second terminal coupled to a second end of the fusible element; and
- a plurality of stacked layers comprising:
  - a first intermediate layer stacked upon the first terminal and the second terminal, the first intermediate layer having a centrally disposed opening;
  - a second intermediate layer stacked upon the first intermediate layer, the second intermediate layer having a centrally disposed opening, wherein the centrally disposed openings of the first intermediate layer and the second intermediate layer define a first chamber above the fusible element; and
  - a first special layer disposed between the first intermediate later and the second intermediate layer, the first special layer dividing the first chamber into a first sub-chamber and a second sub-chamber, wherein the first special layer comprises one or more geometric blockages between the first sub-chamber and the second sub-chamber to at least partially define a first wall between the first sub-chamber and the second sub-chamber, and wherein the first special layer comprises one or more openings in the first wall to define one or more pathways between the first sub-chamber and the second sub-chamber.

2. The fuse of claim 1, the plurality of stacked layers further comprising:
- a third intermediate layer stacked below the first terminal and the second terminal, the third intermediate layer having a centrally disposed opening; and
- a fourth intermediate layer beneath the third intermediate layer, the fourth intermediate layer having a centrally disposed opening, wherein the centrally disposed openings of the third intermediate layer and the fourth intermediate layer define a second chamber below the fusible element.

3. The fuse of claim 2, the plurality of stacked layers further comprising a second special layer disposed between the third intermediate layer and the fourth intermediate layer, the second special layer dividing the second chamber into a third sub-chamber and a fourth sub-chamber, wherein the second special layer includes one or more geometric blockages between the third sub-chamber and the fourth sub-chamber to at least partially define a second wall between the third sub-chamber and the fourth sub-chamber, and wherein the second special layer includes one or more openings in the second wall to define one or more pathways between the third sub-chamber and the fourth sub-chamber.

4. The fuse of claim 3, wherein the one or more geometric blockages of the second special layer are the same as the one or more geometric blockages of the first special layer.

5. The fuse of claim 3, wherein the one or more geometric blockages of the second special layer are different from the one or more geometric blockages of the first special layer.

6. The fuse of claim 1, wherein the one or more openings in the first wall comprise a plurality of holes located along a center line of the first special layer.

7. The fuse of claim 6, wherein the plurality of holes comprises three holes.

8. The fuse of claim 6, wherein the plurality of holes comprises five holes.

9. The fuse of claim 1, wherein the one or more geometric blockages comprise a plurality of horizontally disposed rectangles located along a center line of the first special layer.

10. The fuse of claim 9, wherein the one or more geometric blockages further comprise a second horizontally disposed rectangle at a first end of the plurality of horizontally disposed rectangles and a third horizontally disposed rectangle at a second end of the plurality of horizontally disposed rectangles, the second horizontally disposed rectangle being larger than any one of the plurality of horizontally disposed rectangles.

11. The fuse of claim 1, wherein the one or more geometric blockages comprise a plurality of vertically disposed rectangles located between a plurality of rivet holes.

12. A fuse comprising:
- a fusible element coupled between two terminals;
- a first intermediate layer comprising a rectangular plate with a centrally disposed cutout;
- a second intermediate layer comprising a first rectangular plate with a centrally disposed cutout, wherein the fusible element is sandwiched between the first intermediate layer and the second intermediate layer, the first intermediate layer defining a first chamber above the fusible element and the second intermediate layer defining a second chamber below the fusible element; and
- a first special layer comprising a second rectangular plate with one or more geometric blockages and one or more openings, wherein the first special layer is stacked upon the first intermediate layer, wherein the first special layer divides the first chamber into a first sub-chamber and a second sub-chamber, wherein the one or more geometric blockages at least partially define a wall between the first sub-chamber and the second sub-chamber, and wherein the one or more openings are in the wall to define one or more pathways between the first sub-chamber and the second sub-chamber.

13. The fuse of claim 12, further comprising a cover layer disposed above the first special layer, wherein the cover layer defines a top of the first sub-chamber.

14. The fuse of claim 13, wherein the one or more openings comprise a hole stamped into the first special layer.

15. The fuse element of claim 13, wherein the one or more openings comprise a rectangle stamped into the first special layer.

16. The fuse element of claim 13, wherein the one or more openings comprise a plurality of rectangles stamped into the first special layer.

17. The fuse element of claim 13, wherein the one or more openings comprise a plurality of holes stamped into a center line of the first special layer.

18. The fuse element of claim 14, wherein the first intermediate layer, the second intermediate layer, the first special layer, and the cover layer are melamine.

19. The fuse element of claim 13, further comprising a second special layer comprising a third rectangular plate with one or more geometric blockages and one or more openings, wherein the second special layer is stacked above the first special layer.

20. The fuse element of claim 19, wherein the one or more geometric blockages of the second special layer are different from the one or more geometric blockages of the first special layer.

* * * * *